(12) United States Patent
Gullander

(10) Patent No.: US 10,721,363 B2
(45) Date of Patent: Jul. 21, 2020

(54) SYSTEM AND METHOD FOR CONTROLLING NOTIFICATIONS IN AN ELECTRONIC DEVICE ACCORDING TO USER STATUS

(71) Applicant: Sony Mobile Communications Inc., Tokyo (JP)

(72) Inventor: Anders Gullander, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/468,377

(22) PCT Filed: Feb. 9, 2017

(86) PCT No.: PCT/US2017/017100
§ 371 (c)(1),
(2) Date: Jun. 11, 2019

(87) PCT Pub. No.: WO2018/147850
PCT Pub. Date: Aug. 16, 2018

(65) Prior Publication Data
US 2019/0373114 A1  Dec. 5, 2019

(51) Int. Cl.
*H04M 19/04* (2006.01)
*G06F 3/01* (2006.01)
(Continued)

(52) U.S. Cl.
CPC .......... *H04M 19/04* (2013.01); *G06F 3/015* (2013.01); *H04M 1/0279* (2013.01); *H04M 1/72569* (2013.01); *H04M 1/72597* (2013.01)

(58) Field of Classification Search
CPC ......... A61B 5/00; A61B 5/0205; A61B 5/024;
G06F 3/01; G06F 3/015; G06F 19/00;
G06F 7/04; G06Q 10/06; G08B 1/08;
G09B 9/052; G16H 40/63; H04M 1/0279;
H04M 1/725; H04M 1/72569; H04M 1/72597;
(Continued)

(56) References Cited

U.S. PATENT DOCUMENTS 5,865,736 A * 2/1999 Baker, Jr. ........... A61B 5/02455
600/323
8,401,606 B2 * 3/2013 Mannheimer ...... A61B 5/02455
600/300
(Continued)

OTHER PUBLICATIONS

International Search Report and Written Opinion from corresponding International Patent Application No. PCT/US2017/017100, dated Jul. 19, 2017, 12 pages.
(Continued)

*Primary Examiner* — Gerald Gauthier
(74) *Attorney, Agent, or Firm* — Tucker Ellis LLP

(57) ABSTRACT

Controlling notification output from an electronic device includes detecting that a stress level of a user of the electronic device is above a predetermined threshold; and in response to the detection that the stress level of the user is above the predetermined threshold, applying a notification rule to control notification output, the application of the notification rule changing how or when a notification for the call or message is output by the electronic device relative to how or when the notification would be output had the user stress level been below the predetermined threshold.

14 Claims, 3 Drawing Sheets

(51) Int. Cl.
*H04M 1/02* (2006.01)
*H04M 1/725* (2006.01)

(58) Field of Classification Search
CPC ........ H04M 3/51; H04M 19/04; H04N 21/81; A63B 24/00
USPC ..... 166/250.01; 340/539.12, 539.13, 539.22, 340/5.52, 5.82, 540; 379/373.03; 434/127; 455/556.1, 567; 600/301, 323, 600/483, 595, 300, 479, 508, 509, 510; 700/91; 702/6; 715/708, 825; 705/2
See application file for complete search history.

(56) References Cited

U.S. PATENT DOCUMENTS

| | | | |
|---|---|---|---|
| 8,529,447 B2* | 9/2013 | Jain | A61B 5/0022 600/300 |
| 8,617,067 B2* | 12/2013 | Jain | A61B 5/4848 600/300 |
| 8,622,901 B2* | 1/2014 | Jain | A61B 5/0022 600/300 |
| 8,941,500 B1 | 1/2015 | Faaborg | |
| 9,189,599 B2* | 11/2015 | Adler | G16H 50/30 |
| 9,380,978 B2* | 7/2016 | Reiner | G06Q 50/22 |
| 9,390,611 B1* | 7/2016 | Maruyama | G08B 25/008 |
| 9,421,420 B2* | 8/2016 | Zhang | A63B 24/0062 |
| 9,848,784 B2* | 12/2017 | Klepp | A61B 5/02405 |
| 10,206,100 B2* | 2/2019 | Kulkarni | H04L 67/327 |
| 10,338,029 B2* | 7/2019 | Nagarkar | A61B 5/029 |
| 10,607,167 B2* | 3/2020 | Ristock | H04L 67/20 |
| 2004/0209584 A1 | 10/2004 | Naboulsi | |
| 2005/0065443 A1* | 3/2005 | Ternes | A61B 5/02405 600/509 |
| 2005/0250552 A1* | 11/2005 | Eagle | H04M 1/7253 455/567 |
| 2007/0021678 A1* | 1/2007 | Beck | A61B 5/0245 600/510 |
| 2010/0004516 A1* | 1/2010 | Teng | A61B 5/02 600/301 |
| 2010/0198608 A1* | 8/2010 | Kaboff | G06Q 10/06311 705/2 |
| 2010/0292545 A1* | 11/2010 | Berka | A61B 5/163 600/301 |
| 2011/0105860 A1* | 5/2011 | Houben | G16H 40/63 600/301 |
| 2011/0169603 A1* | 7/2011 | Fithian | H04N 19/172 340/5.52 |
| 2012/0029300 A1* | 2/2012 | Paquet | G06F 19/3418 600/300 |
| 2012/0065480 A1* | 3/2012 | Badilini | A61B 5/165 600/301 |
| 2012/0108915 A1* | 5/2012 | Corbucci | A61B 5/02438 600/301 |
| 2012/0157789 A1 | 6/2012 | Kangas | |
| 2012/0215075 A1* | 8/2012 | Surace | A61B 5/0002 600/301 |
| 2012/0265028 A1* | 10/2012 | Hughes | A61B 5/031 600/301 |
| 2013/0060168 A1* | 3/2013 | Chu | A42B 3/046 600/595 |
| 2014/0007010 A1* | 1/2014 | Blom | G06F 3/011 715/825 |
| 2014/0085050 A1* | 3/2014 | Luna | G07C 9/257 340/5.82 |
| 2014/0121543 A1* | 5/2014 | Chan | A61B 5/02405 600/483 |
| 2014/0200468 A1* | 7/2014 | Cho | A61B 5/024 600/508 |
| 2014/0258856 A1* | 9/2014 | Mauro | G06F 3/038 715/708 |
| 2014/0371608 A1* | 12/2014 | Nageshwar | A61N 1/0502 600/508 |
| 2015/0018636 A1* | 1/2015 | Romesburg | A61B 5/024 600/301 |
| 2015/0051721 A1* | 2/2015 | Cheng | G06K 9/0055 700/91 |
| 2015/0099987 A1* | 4/2015 | Bhatkar | G16H 30/40 600/479 |
| 2015/0118658 A1* | 4/2015 | Mayou | A61B 5/01 434/127 |
| 2015/0142315 A1* | 5/2015 | Guzzo | E21B 47/0001 702/6 |
| 2015/0176370 A1* | 6/2015 | Greening | E21B 19/06 166/250.01 |
| 2015/0182129 A1* | 7/2015 | Colley | A61B 5/7278 600/301 |
| 2015/0223746 A1* | 8/2015 | Bonnet | G16H 50/30 600/301 |
| 2015/0238140 A1* | 8/2015 | LaBelle | A61B 5/16 600/508 |
| 2015/0269835 A1* | 9/2015 | Benoit | G08B 25/016 340/539.13 |
| 2015/0279187 A1* | 10/2015 | Kranz | G08B 21/0456 340/539.12 |
| 2015/0305675 A1* | 10/2015 | Miller | A61B 5/0205 600/301 |
| 2015/0305690 A1* | 10/2015 | Tan | G08B 21/0446 600/301 |
| 2015/0371516 A1* | 12/2015 | Petersen | G08B 21/02 340/539.12 |
| 2015/0374310 A1* | 12/2015 | Lee | A61B 5/7285 600/483 |
| 2016/0063828 A1* | 3/2016 | Moussette | G06F 11/0763 340/540 |
| 2016/0063850 A1* | 3/2016 | Yang | G08B 23/00 340/539.22 |
| 2016/0089038 A1* | 3/2016 | Chadderdon, III | A61B 5/02055 600/301 |
| 2016/0174857 A1* | 6/2016 | Eggers | G06F 19/3418 600/301 |
| 2016/0324487 A1* | 11/2016 | Guo | A61B 5/0816 |
| 2016/0338640 A1* | 11/2016 | Chan | A61B 5/4884 |
| 2016/0373573 A1 | 12/2016 | Bivens | |
| 2016/0381534 A1* | 12/2016 | Kwon | H04N 21/42201 455/556.1 |
| 2017/0010665 A1* | 1/2017 | Tanaka | G06F 3/015 |
| 2017/0011191 A1* | 1/2017 | Rajasekar | G06F 19/3418 |
| 2017/0020444 A1* | 1/2017 | Lurie | A61B 5/486 |
| 2017/0064412 A1* | 3/2017 | Taxier | H04N 21/8133 |
| 2017/0071551 A1* | 3/2017 | Jain | A61B 5/0006 |
| 2017/0104872 A1* | 4/2017 | Ristock | H04M 3/523 |
| 2017/0149956 A1* | 5/2017 | Thorn | G06F 3/015 |
| 2017/0172424 A1* | 6/2017 | Eggers | A61B 5/0205 |
| 2017/0213474 A1* | 7/2017 | Welles | G09B 9/052 |
| 2018/0218123 A1* | 8/2018 | Gomez Sanchez | G16H 40/67 |
| 2018/0322950 A1* | 11/2018 | Cronin | A61B 5/6851 |
| 2019/0373114 A1* | 12/2019 | Gullander | H04M 1/72569 |

OTHER PUBLICATIONS

Clark-Billings, Lucy, "Psychologists warn constant email notifications are 'toxic source of stress'," The Telegraph, Jan. 2, 2016, 4 pages.

* cited by examiner

SYSTEM AND METHOD FOR CONTROLLING NOTIFICATIONS IN AN ELECTRONIC DEVICE ACCORDING TO USER STATUS

TECHNICAL FIELD OF THE INVENTION

The technology of the present disclosure relates generally to electronic devices and, more particularly, to a system and method for controlling when notifications are presented to a user to avoid raising user stress level or disturbing restorative time.

BACKGROUND

Portable electronic devices, such as mobile telephones and tablet computers, are now in widespread use. Users employ these devices for a wide variety of functions include receiving and making audio and video calls, receiving and sending messages (e.g., electronic mail, text messages, multimedia messages, voice messages, etc.), maintaining a calendar, accessing the Internet, and running a number of applications.

Recent research has indicated that incoming calls and messages can cause a physiological stress response in users. Notifications are typically used to alert a user to incoming calls and messages, as well as other events such as calendar reminders. Without intending to be bound by theory, it is contemplated that a user's stress response may be caused, at least in part, by notifications and the circumstances in which they arise. For instance, stress may rise due to a relatively high volume of notifications in a given period of time, notifications for calls and messages originating from specific people or categories of people, or notifications that arrive when another potentially stress-invoking event is occurring.

Many electronic devices offer a "do not disturb" mode or a "silent" mode. In these modes, the manner in which notifications are output by the electronic device may be altered (e.g., made non-audible) or the number of notifications may be reduced by delaying the presentation of notifications until the mode is changed. The activation of one of these modes is a manual function that requires user action.

SUMMARY

According to one aspect of the disclosure, a method of controlling notification output from an electronic device includes detecting that a stress level of a user of the electronic device is outside a predetermined range; and in response to the detection that the stress level of the user is outside the predetermined range, applying a notification rule to control notification output from the electronic device, the application of the notification rule changing how or when one or more notifications are output by the electronic device relative to how or when the one or more notifications would be output had the user stress level been within the predetermined range.

According to one embodiment of the method, detecting that the stress level of the user is outside the predetermined range includes monitoring a physiological condition of the user.

According to one embodiment of the method, physiological condition of the user comprises heart rate.

According to one embodiment of the method, the notification rule places the electronic device in a silent mode.

According to one embodiment of the method, the notification rule delays output of the one or more notifications until the stress level of the user is within a tolerable range.

According to one embodiment of the method, the notification rule has an exception for a notification having one or more predetermined characteristics and does not change how or when the excepted notification is output.

According to one embodiment of the method, the method further includes monitoring one or more context factors associated with at least one of the user or the electronic device; determining from the one or more context factors that a context-based stress indicting situation is present; and in response to the detection that the context-based stress indicting situation is present, applying a notification rule associated with the context-based stress indicating situation to control notification output from the electronic device, the application of the notification rule changing how or when one or more notifications are output by the electronic device relative to how or when the one or more notifications would be output had the context-based stress indicting situation not been present.

According to one embodiment of the method, the notification rule associated with the context-based stress indicating situation is generated as a function of user behavior in similar contextual situations to the context-based stress indicting situation.

According to another aspect of the disclosure, an electronic device is configured to control a manner in which notifications are output from the electronic device. The electronic device includes a memory that stores executable logic; and a controller that, by execution of the executable logic, is configured to: detect that a stress level of a user of the electronic device is outside a predetermined range; and in response to the detection that the stress level of the user is outside the predetermined range, apply a notification rule to control notification output from the electronic device, the application of the notification rule changing how or when one or more notifications are output by the electronic device relative to how or when the one or more notifications would be output had the user stress level been within the predetermined range.

According to one embodiment of the electronic device, the processor monitors a physiological condition of the user to detect that the stress level of the user is outside the predetermined range.

According to one embodiment of the electronic device, the physiological condition of the user comprises heart rate.

According to one embodiment of the electronic device, the notification rule places the electronic device in a silent mode.

According to one embodiment of the electronic device, the notification rule delays output of the one or more notifications until the stress level of the user is within a tolerable range.

According to one embodiment of the electronic device, the notification rule has an exception for a notification having one or more predetermined characteristics and does not change how or when the excepted notification is output.

According to one embodiment of the electronic device, the processor is further configured to: monitor one or more context factors associated with at least one of the user or the electronic device; determine from the one or more context factors that a context-based stress indicting situation is present; and in response to the detection that the context-based stress indicting situation is present, apply a notification rule associated with the context-based stress indicating situation to control notification output from the electronic device, the application of the notification rule changing how or when one or more notifications are output by the electronic device relative to how or when the one or more notifications would be output had the context-based stress indicting situation not been present.

According to one embodiment of the electronic device, the notification rule associated with the context-based stress indicating situation is generated as a function of user behavior in similar contextual situations to the context-based stress indicting situation.

According to another aspect of the disclosure, a non-transitory computer readable medium stores executable logic for controlling a manner in which notifications are output from an electronic device. The executable logic includes logic to, when executed: detect that a stress level of a user of the electronic device is outside a predetermined range; and in response to the detection that the stress level of the user is outside the predetermined range, apply a notification rule to control notification output from the electronic device, the application of the notification rule changing how or when one or more notifications are output by the electronic device relative to how or when the one or more notifications would be output had the user stress level been within the predetermined range.

According to one embodiment of the non-transitory computer readable medium, detection that the stress level of the user is outside the predetermined range is based on a value of a monitored physiological condition of the user.

According to one embodiment of the non-transitory computer readable medium, the executable logic further includes logic to: monitor one or more context factors associated with at least one of the user or the electronic device; determine from the one or more context factors that a context-based stress indicting situation is present; and in response to the detection that the context-based stress indicting situation is present, apply a notification rule associated with the context-based stress indicating situation to control notification output from the electronic device, the application of the notification rule changing how or when one or more notifications are output by the electronic device relative to how or when the one or more notifications would be output had the context-based stress indicting situation not been present.

According to one embodiment of the non-transitory computer readable medium, the notification rule associated with the context-based stress indicating situation is generated as a function of user behavior in similar contextual situations to the context-based stress indicting situation.

DETAILED DESCRIPTION OF EMBODIMENTS

Figure 1:
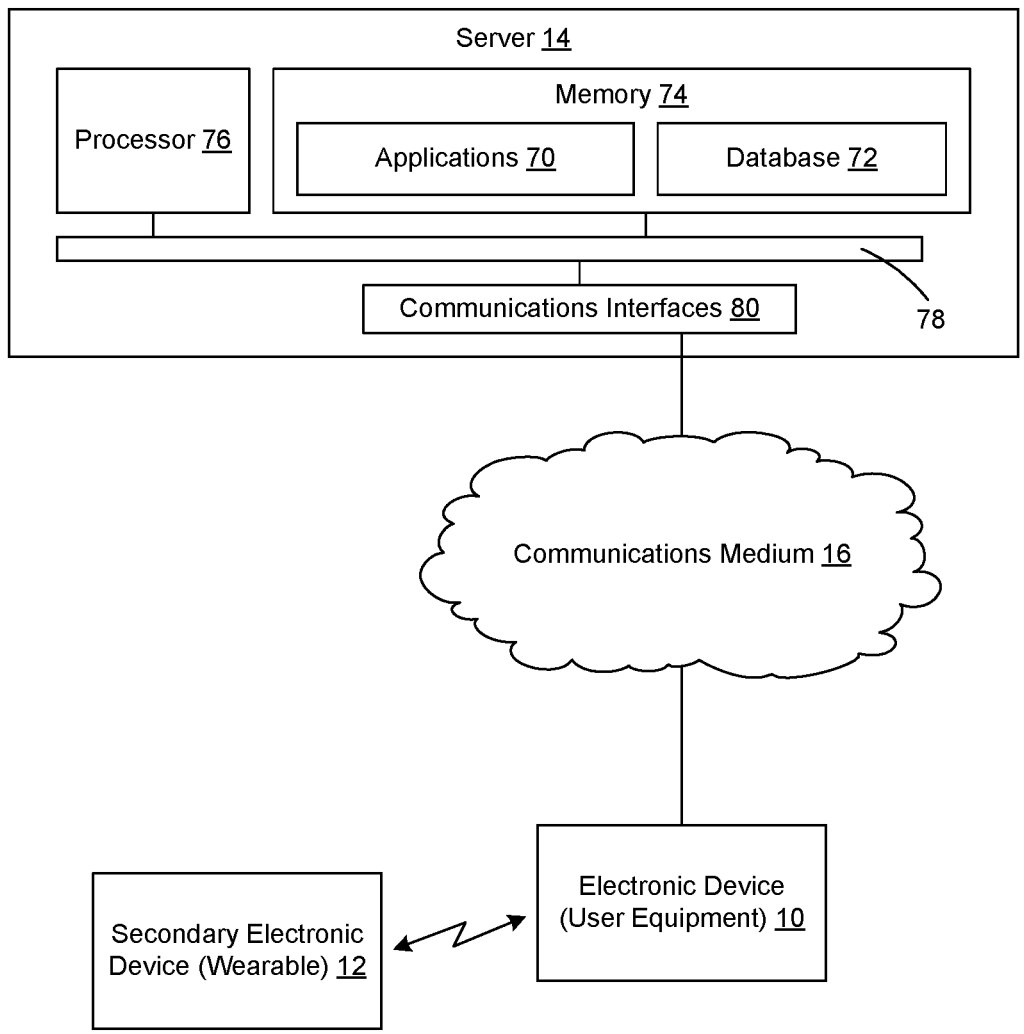
FIG. 1 is a schematic diagram of an operational environment for an electronic device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Introduction

Described below, in conjunction with the appended figures, are various embodiments of systems and methods for controlling when and how notifications of incoming calls and messages are presented to a user to avoid raising user stress level resulting from the user's possible physiological stress response to the notifications. The implementation of the disclosed notification control techniques may be carried out in an automated manner by the electronic device. Therefore, the implementation is not reliant on user activation of a mode of the electronic device to change how notifications are output or to delay the output of notifications.

The systems and methods address issues introduced by mobile devices themselves. That is, due to the portability mobile devices, users are almost always nearby their respective devices and subjected to notifications. Therefore, the mere presence of the electronic device may introduce stress to the user upon the output of notifications for events such as incoming calls, incoming messages and calendar reminders.

The systems and methods address these issues by monitoring one or more inputs indicative of user stress level or the potential to raise user stress level. If a stress-related trigger is detected from the monitored input(s), notification handling rules may be implemented to avoid presenting a notification to the user in an attempt to avoid increasing the user's stress level.

As used herein, a notification is an output from an electronic device that alerts the user to an incoming call, an incoming message or a calendar event reminder. A notification may be audible (e.g., a ring tone or sound that is played), may be tactile (e.g., a vibration), and/or may be visual (e.g., a text box or other graphic displayed on the display, a number or symbol added to an icon, etc.). Incoming calls may be any type of call including, but not limited to, audio calls, video calls and chats, etc. Incoming messages may be any type of message including, but not limited to, electronic mail messages, text messages, multimedia messages, instant messages, voice mail messages, availability of social media posts, and automated messages related to applications. Exemplary automated messages related to applications include weather notifications, traffic alerts, news alerts, etc. High priority automated messages may be excluded from notification controls described herein. High priority automated messages may include, for example, severe weather alerts (e.g., an alert of a nearby tornado) and traffic alerts pertaining to a current travel route of the user.

System Architecture

FIG. 1 is a schematic diagram of an exemplary system for implementing the disclosed techniques. It will be appreciated that the illustrated system is representative and other systems may be used to implement the disclosed techniques. Also, functions disclosed as being carried out by a single device, such as the disclosed electronic device, or may be carried out in a distributed manner across nodes of a computing environment.

The system includes an electronic device 10, also referred to as a user equipment or UE. The electronic device 10 may be, but is not limited to, a mobile radiotelephone (a "smartphone"), a tablet computing device, a computer, etc. In some embodiments, the electronic device 10 is in operative communication with a secondary electronic device 12 that monitors a user of the electronic device 10. The secondary electronic device 12 may be a wearable device that is worn by the user and includes a sensor for monitoring a condition related to the user. Exemplary secondary electronic devices 12 include, but are not limited to, an activity tracker, a bracelet, a watch, a necklace, a heart rate monitor, eyeglasses, an article of clothing, earphones or a headset, etc.

At times, the electronic device 14 may be in operative communication with a server 14 via a communications medium 16. The communications medium 16 may include one or more networks, such as a subscriber network, a local area network, the Internet, etc.

As will be described, the electronic device 10 and the secondary electronic device 12 are configured to carry out the respective logical functions that are described herein. In addition, the server 14 may carry out support and service operations for the electronic device 10 including, for example, the management of calls and the delivery of messages.

Figure 2:
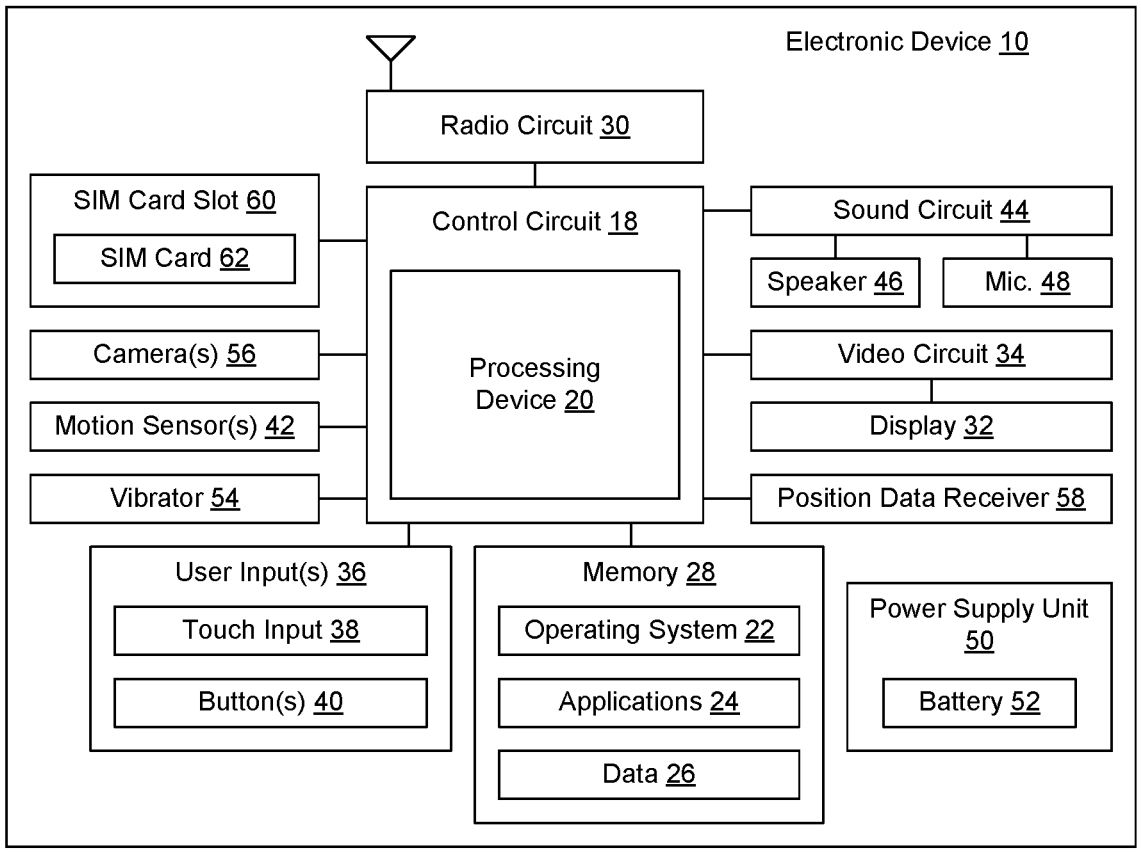
FIG. 2 is a schematic diagram of the electronic device.
Figure 3:
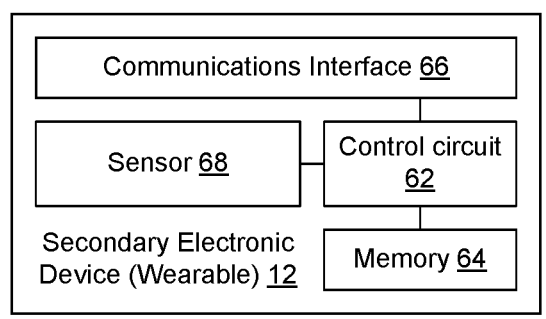
FIG. 3 is a schematic diagram of a secondary electronic device that monitors a user of the electronic device.

With additional reference to FIG. 2, illustrated is a schematic block diagram of the electronic device 10 in an exemplary embodiment as a mobile telephone. The electronic device 10 includes a control circuit 18 that is responsible for overall operation of the electronic device 10, including controlling the electronic device 10 to carry out the operations described in greater detail below. The control circuit 18 includes a processor 20 that executes an operating system 22 and various applications 24. The functions described in this disclosure document may be embodied as part of the operating system 22. In other embodiments, these functions may be embodied as a dedicated application or part of an application used for other tasks.

The operating system 22, the applications 24, and stored data 26 (e.g., data associated with the operating system 22, the applications 24, and user files), are stored on a memory 28. The operating system 22 and applications 24 are embodied in the form of executable logic routines (e.g., lines of code, software programs, etc.) that are stored on a non-transitory computer readable medium (e.g., the memory 28) of the electronic device 10 and are executed by the control circuit 18. The functions described herein may be thought of as methods that are carried out by the electronic device 10.

The processor 20 of the control circuit 18 may be a central processing unit (CPU), microcontroller, or microprocessor. The processor 20 executes code stored in a memory (not shown) within the control circuit 18 and/or in a separate memory, such as the memory 28, in order to carry out operation of the electronic device 10. The memory 28 may be, for example, one or more of a buffer, a flash memory, a hard drive, a removable media, a volatile memory, a non-volatile memory, a random access memory (RAM), or other suitable device. In a typical arrangement, the memory 28 includes a non-volatile memory for long term data storage and a volatile memory that functions as system memory for the control circuit 18. The memory 28 may exchange data with the control circuit 18 over a data bus. Accompanying control lines and an address bus between the memory 28 and the control circuit 18 also may be present. The memory 28 is considered a non-transitory computer readable medium.

The electronic device 10 includes communications circuitry that enables the electronic device 10 to establish various wireless communication connections. In the exemplary embodiment, the communications circuitry includes a radio circuit 30. The radio circuit 30 includes one or more radio frequency transceivers and an antenna assembly (or assemblies). In the case that the electronic device 10 is a multi-mode device capable of communicating using more than one standard or protocol, over more than one radio access technology (RAT) and/or over more than one radio frequency band, the radio circuit 30 represents one or more than one radio transceiver, one or more than one antenna, tuners, impedance matching circuits, and any other components needed for the various supported frequency bands and radio access technologies. Exemplary network access technologies supported by the radio circuit 30 include cellular circuit-switched network technologies and packet-switched network technologies. The radio circuit 30 further represents any radio transceivers and antennas used for local wireless communications directly with another electronic device, such as over a Bluetooth interface and/or over a body area network (BAN) interface.

The electronic device 10 further includes a display 32 for displaying information to a user. The display 32 may be coupled to the control circuit 18 by a video circuit 34 that converts video data to a video signal used to drive the display 32. The video circuit 34 may include any appropriate buffers, decoders, video data processors, and so forth.

The electronic device 10 may include one or more user inputs 36 for receiving user input for controlling operation of the electronic device 10. Exemplary user inputs 36 include, but are not limited to, a touch sensitive input 38 that overlays or is part of the display 32 for touch screen functionality, and one or more buttons 40. Other types of data inputs may be present, such as one or more motion sensors 42 (e.g., gyro sensor(s), accelerometer(s), etc.).

The electronic device 10 may further include a sound circuit 44 for processing audio signals. Coupled to the sound circuit 44 are a speaker 46 and a microphone 48 that enable audio operations that are carried out with the electronic device 10 (e.g., conduct telephone calls, output sound, capture audio, etc.). The sound circuit 44 may include any appropriate buffers, encoders, decoders, amplifiers, and so forth.

The electronic device 10 may further include a power supply unit 50 that includes a rechargeable battery 52. The power supply unit 50 supplies operational power from the battery 52 to the various components of the electronic device 10 in the absence of a connection from the electronic device 10 to an external power source.

The electronic device 10 also may include various other components. For instance, the electronic device 10 may includes one or more input/output (I/O) connectors (not shown) in the form electrical connectors for operatively connecting to another device (e.g., a computer) or an accessory (e.g., the secondary electronic device 12) via a cable, or for receiving power from an external power supply.

Another exemplary component is a vibrator 54 that is configured to vibrate the electronic device 10. Some notifications of events, such as incoming calls or messages, may include activating the vibrator.

Another exemplary component may be one or more cameras 56 for taking photographs or video, or for use in video telephony. As another example, a position data receiver 58, such as a global positioning system (GPS) receiver, may be present to assist in determining the location of the electronic device 10. The electronic device 10 also may include a subscriber identity module (SIM) card slot 60 in which a SIM card 62 is received. The slot 60 includes any appropriate connectors and interface hardware to establish an operative connection between the electronic device 10 and the SIM card 62.

The secondary electronic device 12 may include various components to carry out its functions and operations. For instance, a control circuit 62 may control the secondary electronic device 12. The control circuit 62 may be in the form of a processor that executes software or may have a dedicated configuration (e.g., implemented as an application specific integrated circuit, or ASIC). If appropriate, the secondary electronic device 12 may include a memory 64 for storing data and/or logical instructions executable by the control circuit 62. Also, the secondary electronic device 12 may include a communications interface 66 to establish operative communication with the electronic device 10 over an appropriate medium. Exemplary mediums may include a cable, the air for exchanging radio signals with the electronic device 10, and the user in the case of a BAN connection. Therefore, the communications interface 66 may support one or more interface technologies such as, but not limited to, USB, Bluetooth, WiFi, BAN, etc.

The secondary electronic device 12 also may include a sensor 68 that detects a physiological condition associated with the user. Plural sensors 68 may be present that detect respective conditions of the user. In other embodiments, one or more sensors for detecting a physiological condition (also referred to as physical state) associated with the user may be present in the electronic device 10. Exemplary sensors 68 for detecting a physical state associated with the user may include, but are not limited to, a heart rate monitor, a breath rate monitor, a blood pressure monitor, a stress hormone response monitor, a pupil dilation monitor, a skin conductivity or galvanic response monitor, a muscle contraction or tension monitor, etc. The sensor 28 generates an output signal corresponding to the monitored physiological condition. The output signal may be analyzed by the control circuit 62 and/or the control circuit 18 to establish a stress level of the user. Various techniques for determining user stress level from physiological condition of the user are known in the art and, for the sake of brevity, will not be described in detail herein.

The server 14 may be implemented as a computer-based system that is capable of executing computer applications 70 (e.g., software programs) that, when executed, carry out functions of the server 14. The applications 70 and a database 72 may be stored on a non-transitory computer readable medium, such as a memory 74. The database 72 may be used to store various information sets used by the server 14. The memory 74 may be a magnetic, optical or electronic storage device (e.g., hard disk, optical disk, flash memory, etc.), and may comprise several devices, including volatile and non-volatile memory components. Accordingly, the memory 74 may include, for example, random access memory (RAM) for acting as system memory, read-only memory (ROM), solid-state drives, hard disks, optical disks, flash devices and/or other memory components, plus associated drives, players and/or readers for the memory devices.

To execute logical operations, the server 14 may include one or more processors 76 used to execute instructions that carry out logic routines. The processor 76 and the memory 74 may be coupled using a local interface 78. The local interface 78 may be, for example, a data bus with accompanying control bus, a network, or other subsystem.

The server 14 may have various input/output (I/O) interfaces for operatively connecting to various peripheral devices, as well as one or more communications interfaces 80. The communications interface 80 may include for example, a modem and/or a network interface card. The communications interface 80 may enable the server 14 to send and receive data signals to and from other computing devices via an external network. In particular, the communications interface 80 may operatively connect the server 14 to one or more external communications mediums, including communications medium 16.

Notification Management

Figure 4:
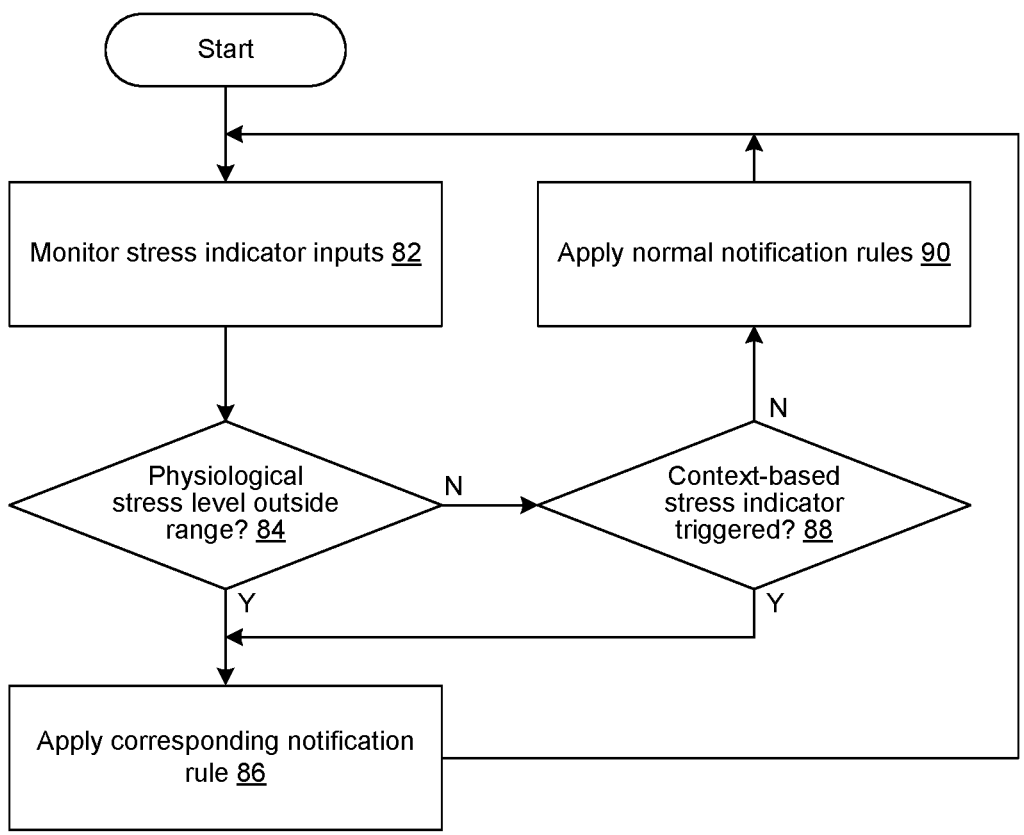
FIG. 4 is a flow-diagram of a notification control operation for the electronic device.

With additional reference to FIG. 4, shown is an exemplary flow diagram representing steps that may be carried out by the electronic device 10 when executing logical instructions to carry out notification management. FIG. 4 illustrates an exemplary process flow representing steps that may be carried out by the electronic device 10 when executing the logical instructions to implement the notification management. Complimentary operations of the secondary electronic device 12 and/or the server 14 also will be understood from this disclosure. Although illustrated in a logical progression, the illustrated blocks of FIG. 4 may be carried out in other orders and/or with concurrence between two or more blocks. Therefore, the illustrated flow diagram may be altered (including omitting steps) and/or may be implemented in an object-oriented manner or in a state-oriented manner.

In one embodiment, the notification management may run in the background during device operation to check for a condition or combination of conditions that trigger applying a notification rule, and then automatically applying the appropriate rule to notification events.

The logical flow may start in block 82 where the electronic device 10 monitors stress indictor inputs. Monitoring stress indicator inputs may include receiving and analyzing signals or input values from one or more sources. For instance, a stress level value may be received from the secondary electronic device 12 or from another process of the electronic device 10. If the stress level value is not separately generated, it may be generated from a signal output by the physiological state monitoring sensor 68. The stress level value is derived from measurements of at least one physiological condition of the user, such as heart rate. The stress level value may be a value from a scale (e.g., a value from 1 to 10 or a value from 1 to 100), may be a value from a set of relative descriptors (e.g., restful, low, moderate, high, extreme, etc.), or may be specified in another manner.

Other stress indicator inputs that are unrelated to physiological state of the user also may be monitored. From these inputs, values related to contextual stress indicator triggers may be generated. Contextual stress indicator triggers will be discussed in greater detail below. As one example of a non-physiological input that is monitored, an amount of time until a calendar event start time may be monitored as a stress indicator input. As a furtherance of this example, a time differential between a calendar event start time and a predicted travel time to the location of the calendar event may be determined and used as a as a stress indicator input. If it is predicted that it will take the user longer to arrive at the event than exists, then it is possible that user stress may be or may become higher than normal.

As another example, mode of travel (e.g., car driven by the user, public transportation, by foot, etc.), rate of travel and location may be monitored as stress indicator inputs. From these inputs, a travel speed differential between the current rate of travel and permissible or typical rate of travel may be generated. If the user is travelling faster than is allowed (e.g., a posted speed limit) or is typical for the mode of travel, then it is possible that the user is rushing to arrive at a location and there is a possibility that user stress may be or may become higher than normal. Similarly, for modes other than walking, if the user is travelling much slower than allowed or is typical for the mode of travel, then it is possible that there are travel delays and there is a possibility that user stress may be or may become higher than normal. Similar information may be derived from a navigation application that has access to traffic information.

As another example, activity of the user may be determined. Activity may be determined from user input and interaction with applications 24, from motion sensor 42 output, from data collected by other devices (e.g., a computer used by the user), etc. Certain activities and, sometimes, the intensity with which user engages in the activity, may be indicative of a condition in which the user has a potential to have a higher or lower stress level than is typical.

As another example, the user's deviation from the user's normal schedule or daily routine may be monitored.

It will be understood that the foregoing examples of non-physiological conditions that may be monitored are not exhaustive of the possible conditions that may be monitored.

Next, in block 84, a determination may be made as to whether the value for the physiological stress level, as determined from the one or more monitored physiological conditions, is outside a predetermined range (e.g., is one or both of greater than a first predetermined threshold or is less than a second predetermined threshold that is lower than the first predetermined threshold). The value for the physiological stress level may be considered a quantification of the user's amount of stress. From this data, if the value is greater than the first predetermined threshold, then a determination may be made that the amount of stress is elevated above a predetermined point. Similarly, if the value is less than the second predetermined threshold, then a determination may be made that the user is in a relaxation (highly restful) state, which may include sleeping. A highly restful state may also occur during meditation or if the user is attempting to purposefully reduce his or her stress level (e.g., by using a breathing exercise or by employing a stretching/muscle contraction routine).

As will be discussed, the electronic device 10 may apply notification rules when the value for the physiological stress level is outside the predetermined range. If the value is greater than the first predetermined threshold, for example, then application of the notification rules may be made in a manner to keep notifications from further increasing the stress level of the user. If the value is less than the second predetermined threshold, for example, then application of the notification rules may be made in a manner to avoid notifications from disturbing the restful state of the user. If the value is in the predetermined range, then it is contemplated that the user is both engaged in normal activity to allow notifications and is relaxed enough such that outputting notifications in a "normal manner" will not raise stress level above a tolerable amount. Outputting notifications in a normal manner constitutes outputting the notifications according to default or user selected settings that are applied to notifications had the notification management operations of FIG. 4 not been executed. In one embodiment, the first predetermined threshold stress level may be selected to correspond to a relatively moderate amount of stress to leave a buffer between the current stress level and the tolerable stress level.

In one embodiment, the first and second predetermined thresholds may be set by default. But the stress reaction to notifications may be different among different users. Therefore, in another embodiment, the electronic device 10 may monitor the user's physiological stress reaction to notifications and adjust one or both of the first and second predetermined thresholds according to the user's typical reaction.

If a determination is made in block 84 that the value of the user's physiological stress level is outside the predetermined range, then the logical flow may proceed to block 86. In block 86, one or more rules concerning when and how notifications are output by the electronic device 10 are applied. In one embodiment, following a positive determination in block 84, the electronic device 10 is placed in a silent mode where no audible notifications are made until the value of the user's stress level enters the predetermined range or enters a second predetermined range indicating that the user is alert and relaxed enough to receive new notifications. Other rules may delay the presentation of visual notifications until the value of the user's stress level enters the predetermined range or enters a second predetermined range indicating that the user is alert and relaxed enough to receive new notifications.

In another embodiment, notifications may be filtered according to default settings and/or user settings. For example, notifications related to calls and/or messages from one or more priority categories of persons may be presented according to normal notification operation and notifications related to calls and/or messages from all other persons may be subjected to a silent mode or a delay as just described. The association of persons with categories may be made using settings in a contact list. For instance, contacts may be categorized into a favorites category, a family category, a coworker or colleague category, etc. Social media connections also may be used to categorize various individuals. In this manner, the user may adjust settings to allow selected notifications from persons in selected categories to be output upon receipt and others to be delayed or output in another manner. As an example, the user may adjust the settings to allow calls from family members and text messages from favorites to be output upon receipt but cause the output of all other notifications to be delayed until stress level enters the appropriate range.

Following block 86, the logical flow may return to block 82 to continue to monitor the stress indicator inputs.

If a negative determination is made in block 84, the logical flow may proceed to block 88. In block 88, a determination is made as to whether a context-based stress indicator has been triggered (e.g., context-based stress indicating situation is present). The determination of block 84 is exclusively based on user stress level. The determination in block 88 is based on one or more stress-indicating context factors other than the user's stress level, but the user's stress level could form part of the determination process. As used herein, context factors are one or more situational conditions that relate to the user and/or the electronic device 10 and that may be monitored for an indication of the potential for the user's stress level to rise. Exemplary context factors include, but are not limited to, the manner in which the electronic device 10 is being used, the location of use, the time and/or day of the week, the activity of the user, the activity or presence of other persons, the nature and frequency of incoming calls and messages, and any other data that may indicate the potential for the user's stress level to rise. The exemplary conditions and inputs monitored in block 82 are additional context factors.

Various context-based stress indicators may be established and compared to predetermined trigger values or metrics. For example, a positive determination may be reached in block 88 if a time difference between the amount of time until a calendar event start time and the predicted travel time to the location of the calendar event is less than a predetermined trigger value. As will be understood, any number of context-based situations may be constructed into a stress indictor that is assessed in block 88.

Following a positive determination in block 88, the logical flow may proceed to block 86. As indicated, in block 86, one or more rules concerning when and how notifications are output by the electronic device 10 are applied. The rule(s) that is applied may correspond to the trigger that resulted in a positive determination in block 88. In other words, each trigger may have an associated rule or rule set that is applied to result in a specific manner in which different notification types are output by the electronic device 10.

In one embodiment, the rules are developed by a learning engine of the electronic device 10 that generates and adapts rules according to user behavior related to responding to notifications under various contextual situations. For instance, the manner in which the user responds to notifications (e.g., answering calls, reading messages, etc.) may be tracked and used in the rule generation process. If a pattern of behavior during an event that triggers a context-based stress indicator is determined, then a corresponding notification rule may be developed. For example, if the user tends to answer calls from family members but not colleagues during the fifteen blocks of time prior to the start time of calendar events, then a rule may be established that within fifteen minutes of a calendar event notifications of calls from family members will be output but notifications of calls from colleagues will not be output.

In another embodiment, the electronic device may monitor user stress level when responding to a notification in various contextual situations. For instance, if a pattern is determined that the user's stress level increases more than a predetermined amount after answering calls or reading messages during a determinable contextual situation, then a corresponding rule may be established to suspend one or more types of notifications during the appropriate contextual situation.

The user also may create custom rules or may modify rules generated by the learning engine.

Following a negative determination in block 88, the logical flow may proceed to block 90. In block 90, notifications will be output by the electronic device 10 in a normal manner. That is, notifications will be output according to default or user selected settings.

CONCLUSION

Although certain embodiments have been shown and described, it is understood that equivalents and modifications falling within the scope of the appended claims will occur to others who are skilled in the art upon the reading and understanding of this specification.

What is claimed is:

1. A method of controlling notification output from an electronic device, comprising:
    determining physiological stress level of a user of the electronic device from measurement of at least one physiological condition of the user;
    comparing the physiological stress level of the user of the electronic device to a predetermined range;
    in response to a detection that the physiological stress level of the user is outside the predetermined range, applying a first notification rule to control output of notifications for one or more of incoming calls, incoming messages or calendar event reminders from the electronic device, the application of the first notification rule changing how or when the notifications are output by the electronic device relative to how or when the notifications would be output had the user stress level been within the predetermined range; and
    in response to a detection that the physiological stress level of the user is inside the predetermined range:
        determining that a context-based stress indicating situation unrelated to physiological state of the user is present; and
        in response to the detection that the context-based stress indicting situation is present, applying a second notification rule associated with the context-based stress indicating situation to control output of notifications for one or more of incoming calls, incoming messages or calendar event reminders from the electronic device, the application of the second notification rule changing how or when the notifications are output by the electronic device relative to how or when the notifications would be output had the context-based stress indicting situation not been present.

2. The method of claim 1, wherein the physiological condition of the user comprises heart rate.

3. The method of claim 1, wherein at least one of the first notification rule or the second notification rule places the electronic device in a silent mode.

4. The method of claim 1, wherein at least one of the first notification rule or the second notification rule delays output of the one or more notifications until the stress level of the user is within a tolerable range.

5. The method of claim 1, wherein at least one of the first notification rule or the second notification rule has an exception for a notification having one or more predetermined characteristics and does not change how or when the excepted notification is output.

6. The method of claim 1, wherein the second notification rule associated with the context-based stress indicating situation is generated as a function of user behavior in similar contextual situations to the context-based stress indicting situation.

7. An electronic device configured to control a manner in which notifications are output from the electronic device, comprising:
    a memory that stores executable logic; and
    a controller that, by execution of the executable logic, is configured to:
    determine physiological stress level of a user of the electronic device from measurement of at least one physiological condition of the user;
    compare the physiological stress level of the user of the electronic device to a predetermined range; and
    in response to a detection that the physiological stress level of the user is outside the predetermined range, apply a first notification rule to control output of notifications for one or more of incoming calls, incoming messages or calendar event reminders from the electronic device, the application of the first notification rule changing how or when the notifications are output by the electronic device relative to how or when the notifications would be output had the user stress level been within the predetermined range; and
    in response to a detection that the physiological stress level of the user is inside the predetermined range:
        determine that a context-based stress indicating situation unrelated to physiological state of the user is present; and
        in response to the detection that the context-based stress indicting situation is present, apply a second notification rule associated with the context-based stress indicating situation to control output of notifications for one or more of incoming calls, incoming messages or calendar event reminders from the electronic device, the application of the second notification rule changing how or when the notifications are output by the electronic device relative to how or when the notifications would be output had the context-based stress indicting situation not been present.

8. The electronic device of claim 7, wherein the physiological condition of the user comprises heart rate.

9. The electronic device of claim 7, wherein at least one of the first notification rule or the second notification rule places the electronic device in a silent mode.

10. The electronic device of claim 7, wherein at least one of the first notification rule or the second notification rule delays output of the one or more notifications until the stress level of the user is within a tolerable range.

11. The electronic device of claim 7, wherein at least one of the first notification rule or the second notification rule has an exception for a notification having one or more predetermined characteristics and does not change how or when the excepted notification is output.

12. The electronic device of claim 7, wherein the second notification rule associated with the context-based stress indicating situation is generated as a function of user behavior in similar contextual situations to the context-based stress indicting situation.

13. A non-transitory computer readable medium storing executable logic for controlling a manner in which notifications are output from an electronic device, the executable logic comprising logic to, when executed:
   determine physiological stress level of a user of the electronic device from measurement of at least one physiological condition of the user;
   compare the physiological stress level of the user of the electronic device to a predetermined range; and
   in response to a detection that the physiological stress level of the user is outside the predetermined range, apply a first notification rule to control output of notifications for one or more of incoming calls, incoming messages or calendar event reminders from the electronic device, the application of the first notification rule changing how or when the notifications are output by the electronic device relative to how or when the notifications would be output had the user stress level been within the predetermined range; and
   in response to a detection that the physiological stress level of the user is inside the predetermined range:
      determine that a context-based stress indicating situation unrelated to physiological state of the user is present; and
      in response to the detection that the context-based stress indicting situation is present, apply a second notification rule associated with the context-based stress indicating situation to control output of notifications for one or more of incoming calls, incoming messages or calendar event reminders from the electronic device, the application of the second notification rule changing how or when the notifications are output by the electronic device relative to how or when the notifications would be output had the context-based stress indicting situation not been present.

14. The non-transitory computer readable medium of claim 13, wherein the second notification rule associated with the context-based stress indicating situation is generated as a function of user behavior in similar contextual situations to the context-based stress indicting situation.

* * * * *